: 3,074,801
Patented Jan. 22, 1963

3,074,801
METALLIC INKS AND PIGMENT FOR USE THEREIN
Albert E. Gessler, Hartsdale, and William H. Van Kirk, New Hyde Park, N.Y., assignors to Interchemical Corporation, New York, N.Y., a corporation of Ohio
No Drawing. Filed Mar. 23, 1959, Ser. No. 800,932
3 Claims. (Cl. 106—30)

This invention is concerned with heat-setting printing links and aims to provide heat-setting inks which are pigmented with metallic powders, which inks exhibit unusually effective leafing of the metallic powder on drying, combined with good binding of the metallic powder to the paper.

Heat-setting printing inks were first introduced in the thirties following the discovery (U.S. Patent 2,087,190) that it was possible to speed up typographic printing of magazines and the like by using inks based on varnishes which were solutions of binders in solvents which had extremely low vapor pressures at ordinary ambient temperature, but whose vapor pressures rose rapidly at temperatures of the order of 300° F. or higher, so that ink films could be dried instantaneously by exposing the paper after printing to temperatures sufficiently high so that a temperature of 300° F. or more was attained by the paper.

In the time that has elapsed since the first introduction of these inks, their use has spread widely, and they have become standard inks for the high-speed typographic and lithographic printing of coated paper. The inks have been widely used in both the publication and packaging fields.

One difficulty with these heat-setting inks has been the fact that poor results are obtained when metallic powders, particularly the so-called gold bronzes, are used in an attempt to get metallic effects. For some reason, the leafing properties of the metallic powders in the vehicles commonly employed in these inks are rather poor. Furthermore, when the ink films are subjected to heat and the ink films dried, the metallic powders which are used are no longer firmly bound to the paper, but rub off easily. The phenomenon is apparently due to the fact that the thermoplastic resins which are used in the inks become sufficiently liquid during the drying operation so that the paper acts as a filtering medium to separate out the very large particles of metal powder which comprise the coloring matter in metallic inks.

The principal object of the present invention is to prepare metallic heat-setting inks which give excellent leafing even with the difficult-to-leaf gold bronzes. Another object of the present invention is to prepare metallic heat-setting inks in which the metal powders are not only properly leafed to give a bright metallic appearance, but also are properly bound in the dried film so that they will not rub off easily.

These and other objects are obtained, according to the present invention, by dispersing a leafing metal powder in a varnish comprising a solution of a thermoplastic resin in a petroleum hydrocarbon of the necessary boiling range for heat-setting inks (between 425 and 600° F., with vapor pressures of the order of 0.05 to below 0.005 mm. at 95° F., corresponding to normal paraffin hydrocarbons in the 14 to 18 carbon atom range) combining with the ink a leafing agent in the form of an aliphatic alcohol containing from 6 to 14 carbon atoms. The ink also contains from about 2 to about 10% of a new form of colloidal alumina hydrate which is characterized by the fact that its ultimate particle size is below the resolving power of the electron microscope, but which at the same time precipitates from an aqueous solution in readily filterable form.

This new form of alumina hydrate can be made by precipitation of dilute aluminum salt solution with a dilute solution of an alkali to precipitate the aluminum as hydroxide. After washing free of soluble anion, the precipitate is treated with an organic acid such as acetic acid until it is slightly acid to litmus paper.

EXAMPLE I

*Making of Alumina Hydrate*

In a typical method of making the pigment, 87 pounds of aluminum sulfate ($Al_2(SO_4)_3 \cdot 18H_2O$) were dissolved in 3600 pounds of water at 45° C. There was slowly added to this material over the course of an hour, a solution of 48 pounds of sodium carbonate in 600 pounds of water at 45° C. The agitation was continued for an additional hour. At this point the pH was 8. The white precipitate settled well, utterly unlike the normal colloidal aluminum hydroxide precipitate obtained when precipitating aluminum salts with alkali. This appears to be largely due to the low concentration of the reactants and the length of time taken to precipitate the product. The product in fact is in such form that it can be washed by decantation, which is done three or four times until the wash water is free of sulfates. At this point 15 parts of 10% acetic acid are added and the bath is agitated for 30 minutes to ensure a slight acidity as evidenced by a red reaction on blue litmus paper. The product filters well and need not be washed. Its wet weight is about 185 pounds. On drying at 50 to 55° C. 28 pounds of a dry alumina hydrate is obtained.

On examination of this pigment under the electron microscope at 25,000 diameters, it is impossible to observe the ultimate particles, indicating that the ultimate particles of the hydrate are under 5 millimicrons in size. The product is characterized by being dispersible in varnishes of the heat-set type to a substantially transparent ink at 20 to 30% pigment concentration.

In preparing the new inks in accordance with this invention, the standard varnishes used in the preparation of heat-setting inks are utilized. These varnishes are conventionally thermoplastic resins dissolved in petroleum hydrocarbons with boiling ranges between 450 and 650° F. In general, the solvents are rather narrow cuts, although wide cut kerosenes have been and may be used.

Among the resins which are commonly used are limed and zincated rosins, hydrocarbon resins, various hardened resins and resin esters, hard hydrocarbon-solvent alkyd resins, modified phenolic resins and the like. In selecting the resin, care should be taken to avoid resins which will react with the metallic powders—e.g.—highly acid resins should be avoided.

In order to get proper leafing in these inks, it is essential that a leafing agent be incorporated in the varnish. Excellent results are obtained with a few per cent of a saturated aliphatic alcohol having between 6 and 14 carbon atoms. Alcohols which have vapor pressures which are essentially like those of the solvents are preferred; undecanol is particularly preferred because it combines the proper boiling range with relatively good odor.

Typical examples of satisfactory inks, in accordance with the invention, are the following:

EXAMPLE II

| Parts by Weight | Gold Bronze Ink | Percent |
|---|---|---|
| 1,320 | Gold Bronze Powder D 170 | 37.9 |
| 1,650 | Varnish A | 47.35 |
| 33 | Non-ionic Surfactant (alkyl phenyl ether of polyethylene glycol) | .95 |
| 275 | Special Hydrate Ink (below) | 7.90 |
| 136.7 | Paraffinic Hydrocarbon Solvent A (boiling range 450 to 470° F.) | 3.90 |
| 68.3 | Paraffinic Hydrocarbon Solvent B (boiling range 430 to 450° F.) | 2.00 |
|  |  | 100.00 |

The ingredients are mixed together in any convenient mixer.

| Parts by Weight | Varnish A | Percent |
|---|---|---|
| 1,800 | Pentalyn K Resin (pentaerythritol ester of rosin dimer) | 55.4 |
| 766 | Solvent A | 23.6 |
| 384 | Solvent B | 11.8 |
| 300 | Undecanol | 9.2 |

Viscosity 53.5 poises.

| Parts by Weight | Hydrate Ink | Percent |
|---|---|---|
| 650 | Special Alumina Hydrate | 33.3 |
| 1,300 | Varnish B | 66.6 |

The hydrate is mixed with the varnish, and milled on a three roll mill till smooth. The ink is almost transparent.

| Parts by Weight | Varnish B | Percent |
|---|---|---|
| 1,800 | Pentalyn G Resin (pentaerythritol ester of rosin condensed with 5% maleic anhydride) | 63.2 |
| 700 | Solvent A | 24.5 |
| 350 | Solvent B | 12.3 |

Viscosity 115 poises—reduce with Solvent A to 22 poises.

This ink prints well, leafs well, and heat dries rapidly. An excellent gold is obtained which, unlike prior art heat set gold inks, is highly resistant when the finger is rubbed over it.

EXAMPLE III

The ink of Example II was made, using aluminum powder instead of the gold bronze, with similar results.

Inks similar to Examples II and III were tested, using various resins in place of the pentaerythritol modified rosin esters of the examples, and using various metallic bronzes. In general, the resins generally applicable to heat set printing were satisfactory for these inks, except that highly acid resin esters and metallic salts tended to react with certain of the gold bronzes in known manner for such bronzes and highly reactive resins. In general, the neutral and slightly acid resins which are non-reactive with the metal powder, were all satisfactory.

Various alcohols were substituted for the undecanol, from N-hexanol to $C_{14}$ alcohols. The $C_{14}$ alcohols tended to slow the ink dry somewhat; n-hexanol was somewhat volatile but produced the desired leafing.

A variety of heat set solvents were used to vary the press-stability and drying speed of the inks, over the range 425 to 600° F., with no change in results.

Obviously, other changes can be made in the specific formulations shown, without departing from the scope of the invention as defined in the claims.

What is claimed is:

1. A heat-setting metallic ink which can be heat set to produce a metallic appearing film in which a metallic powder is tightly bound to a base, said ink consisting essentially of metallic powder, a varnish consisting essentially of a petroleum hydrocarbon having a boiling range between 425° and 600° F., having dissolved therein a resin non-reactive with the metallic powder, an aliphatic alcohol containing from 6 to 14 carbon atoms and from 2% to 10% by weight of hydrated alumina having an ultimate particle size of less than 5 millimicrons and being dispersible in the varnish to produce a substantially transparent ink.

2. A heat-setting metallic ink as defined in claim 1, in which the metallic powder is a gold bronze powder, the aliphatic alcohol is undecanol, the amount of hydrated alumina in the ink is about 7.9% by weight, and the amount of undecanol in the ink is about 4.4% by weight.

3. The ink of claim 2, in which the resin is a pentaerythritol ester of a modified rosin.

References Cited in the file of this patent

UNITED STATES PATENTS

| 2,357,101 | Geddes | Aug. 29, 1944 |
| 2,434,168 | Krumbhaar | Jan. 6, 1948 |
| 2,525,279 | Allen | Oct. 10, 1950 |
| 2,549,549 | Wall | Apr. 17, 1951 |
| 2,662,027 | Pike et al. | Dec. 8, 1953 |
| 2,944,914 | Bugosh | July 12, 1960 |

OTHER REFERENCES

Ellis: "Printing Inks," publ. 1940, Reinhold, N.Y.C. (pages 358–368).